(12) United States Patent
Hodgson et al.

(10) Patent No.: US 8,484,716 B1
(45) Date of Patent: Jul. 9, 2013

(54) HOSTING A SERVER APPLICATION ON MULTIPLE NETWORK TIERS

(75) Inventors: Seth Hodgson, Oakland, CA (US); Mete Atamel, Boston, MA (US)

(73) Assignee: Adobe Systems Incorporated, San Jose, CA (US)

( * ) Notice: Subject to any disclaimer, the term of this patent is extended or adjusted under 35 U.S.C. 154(b) by 889 days.

(21) Appl. No.: 12/537,921

(22) Filed: Aug. 7, 2009

(51) Int. Cl.
*G06F 9/00* (2006.01)

(52) U.S. Cl.
USPC .......................................................... 726/11

(58) Field of Classification Search
USPC .......................................................... 726/11
See application file for complete search history.

(56) References Cited

U.S. PATENT DOCUMENTS

| | | | |
|---|---|---|---|
| 6,032,259 A * | 2/2000 | Nemoto | 726/3 |
| 6,128,279 A | 10/2000 | O'Neil et al. | |
| 7,155,515 B1 | 12/2006 | Brown et al. | |
| 7,512,707 B1 | 3/2009 | Manapragada et al. | |
| 2002/0049842 A1 | 4/2002 | Huetsch et al. | |

OTHER PUBLICATIONS

*Adobe® LiveCycle® ES: Business Transformation Edition*, Adobe Systems Incorporated, 2008. (Total 5 pages).
*Adobe® LiveCycle® ES*, Adobe Systems Incorporated, 2008. (Total 11 pages).
*Adobe® Flash® Media Server 3.5*, Adobe Systems Incorporated, 2008. (Total 59 pages).
*Macromedia® Flash® Media Server 2, Using Flash Media Server Edge Servers*, Macromedia, Inc., Oct. 2005. (Total 20 pages).
*LiveCycle® ES Overview, Adobe® LiveCycle® ES Update 1*, Adobe Systems Incorporated, Oct. 2008. (Total 73 pages).
*What's New for LiveCycle® ES, Adobe LiveCycle® ES Update 1*, Adobe Systems Incorporated, Jul. 2008. (Total 24 pages).

* cited by examiner

*Primary Examiner* — Jacob Lipman
(74) *Attorney, Agent, or Firm* — Finch & Maloney PLLC

(57) ABSTRACT

Methods, systems, and apparatus, including computer programs encoded on a computer storage medium, for allocating server application logic across multiple tiers of a server system are described. In one aspect, a method includes hosting a server application on multiple servers. The servers include an application server deployed in a secure tier of an enterprise network and an edge server deployed in an edge tier of the enterprise network. A primary firewall isolates the secure tier from the edge tier and from a public network. A secondary firewall isolates the edge tier from the public network. The edge server is configured to receive requests for services provided by the server application, to perform a first subset of the services, and to relay a subset of the requests to the application server. The requests received by the edge server are sent from at least one client device through the public network and authenticated by the secondary firewall. The application server is configured to receive the relayed subset of requests and perform a second subset of the services in response to the relayed subset of requests. The relayed subset of requests received by the application server are authenticated by the primary firewall.

22 Claims, 5 Drawing Sheets

HOSTING A SERVER APPLICATION ON MULTIPLE NETWORK TIERS

BACKGROUND

This specification relates to hosting a server application on an enterprise network. In a conventional enterprise network, origin servers execute code to provide server-side software functionality for client devices. Reverse proxy servers can broker traffic between the client devices and the origin servers. The reverse proxy servers intercept communication from the client devices and communicate with the origin servers on behalf of the client devices. The origin servers generate responses to the client requests and send the responses to the reverse proxy servers. The reverse proxy servers forward the responses to the client devices and cache the responses for later use. In some cases, the reverse proxy servers distribute the requests across nodes of an origin server cluster. The reverse proxy servers can be deployed in a DMZ of an enterprise network and communicate with client devices through a public network. The host servers can be deployed in the enterprise's internal network, which is isolated from the public network by the DMZ.

SUMMARY

This specification describes technologies relating to hosting a server application on multiple tiers of an enterprise network.

In general, one innovative aspect of the subject matter described in this specification can be embodied in methods that include the actions of hosting a server application on multiple server devices. The server devices include an application server device deployed in a secure tier of an enterprise network and an edge server device deployed in an edge tier of the enterprise network. A primary firewall isolates the secure tier from the edge tier and from a public network. A secondary firewall isolates the edge tier from the public network. The edge server is configured to receive requests for services provided by the server application, to perform a first subset of the services, and to relay a subset of the requests to the application server. The requests received by the edge server are sent from at least one client device through the public network and authenticated by the secondary firewall. The application server is configured to receive the relayed subset of requests and perform a second subset of the services in response to the relayed subset of requests. The relayed subset of requests received by the application server are authenticated by the primary firewall. Other embodiments of this aspect include corresponding systems, apparatus, and computer programs, configured to perform the actions of the methods, encoded on computer storage devices.

These and other embodiments can each optionally include one or more of the following features. The edge server supports multiple different transport protocols. The edge tier is transparent to the at least one client device. The edge server is configured to relay the subset of requests based on the edge server identifying that the application server is configured to perform the subset of requests. The edge server can be configured to perform the first subset of the services by storing a first configuration file in a memory of the edge server. The first configuration file identifies the first subset of the services as services that the edge server is configured to perform. The edge server stores application logic for performing both the first subset of the services and the second subset of the services. The application server can be configured to perform the second subset of the services by storing a second configuration file in a memory of the application server. The second configuration file identifies the second subset of the services as services that the application server is configured to perform. The application server stores application logic for performing both the first subset of the services and the second subset of the services. The edge server can be configured to perform the first subset of the services by programming server application logic stored on the edge server to perform only the first subset of services. The application server can be configured to perform the second subset of the services by programming server application logic stored on the application server to perform only the second subset of services. Latency tolerances can be identified for each of the first subset of services and for each of the second subset of services. The edge server can be configured to perform the first subset of the services based at least in part on the latency tolerances identified for the first subset of services. The application server can be configured to perform the second subset of the services based at least in part on the latency tolerances identified for the second subset of services. The latency tolerances identified for the second subset of services can include higher latency tolerances than the latency tolerances identified for the first subset of services. Levels of information security required for each the first subset of services and for each of the second subset of services can be identified. The edge server can be configured to perform the first subset of the services based at least in part on the levels of information security required for the first subset of services. The application server can be configured to perform the second subset of the services based at least in part on the levels of information security required for the second subset of services. The identified levels of information security required for the second subset of services can include higher levels of information security than the identified levels of information security required for the first subset of services. The edge tier can be included in a DMZ of the enterprise network, the secure tier can be included in an internal network of the enterprise, and the DMZ can isolate the internal network from the public network. The edge server is a first edge server device, the application server is a first application server device, and servers further include additional application servers deployed in the secure tier and additional edge servers deployed in the edge tier.

Particular embodiments of the subject matter described in this specification can be implemented so as to realize one or more of the following advantages. Functionality of a server-side application can be declaratively and/or dynamically partitioned across an edge network tier hosted within a network DMZ and a secure network tier hosted behind the DMZ. The secure network tier can be a higher security network tier than the edge network tier. For example, the edge network tier can be minimally secured to provide near real-time interactions between edge servers and clients, and the application or secure network tier can be maximally secured to ensure the integrity of functionality provided behind the DMZ. As such, web clients may establish a near real-time connection to the edge network tier, and the clients may also be granted seamless and transparent access to services running in either the edge network tier or the secure network tier under a consistent authentication state, with little or no impact on client code or configuration. This may allow security-insensitive server logic and near real-time data push with low latency requirements to execute at the edge network tier and sensitive server logic that has less stringent latency requirements to be executed on the secure network tier. In some implementations, a server portion of a rich internet application can be defined in a pluggable fashion that supports declarative partitioning, and the server portion of a rich internet application can be allocated across network tiers (e.g., the DMZ tier and the secure network tier) without having to re-code either the client portion or the server portion of the rich internet application. As such, the partitioning of services across network tiers can be accomplished without modifications to application logic.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
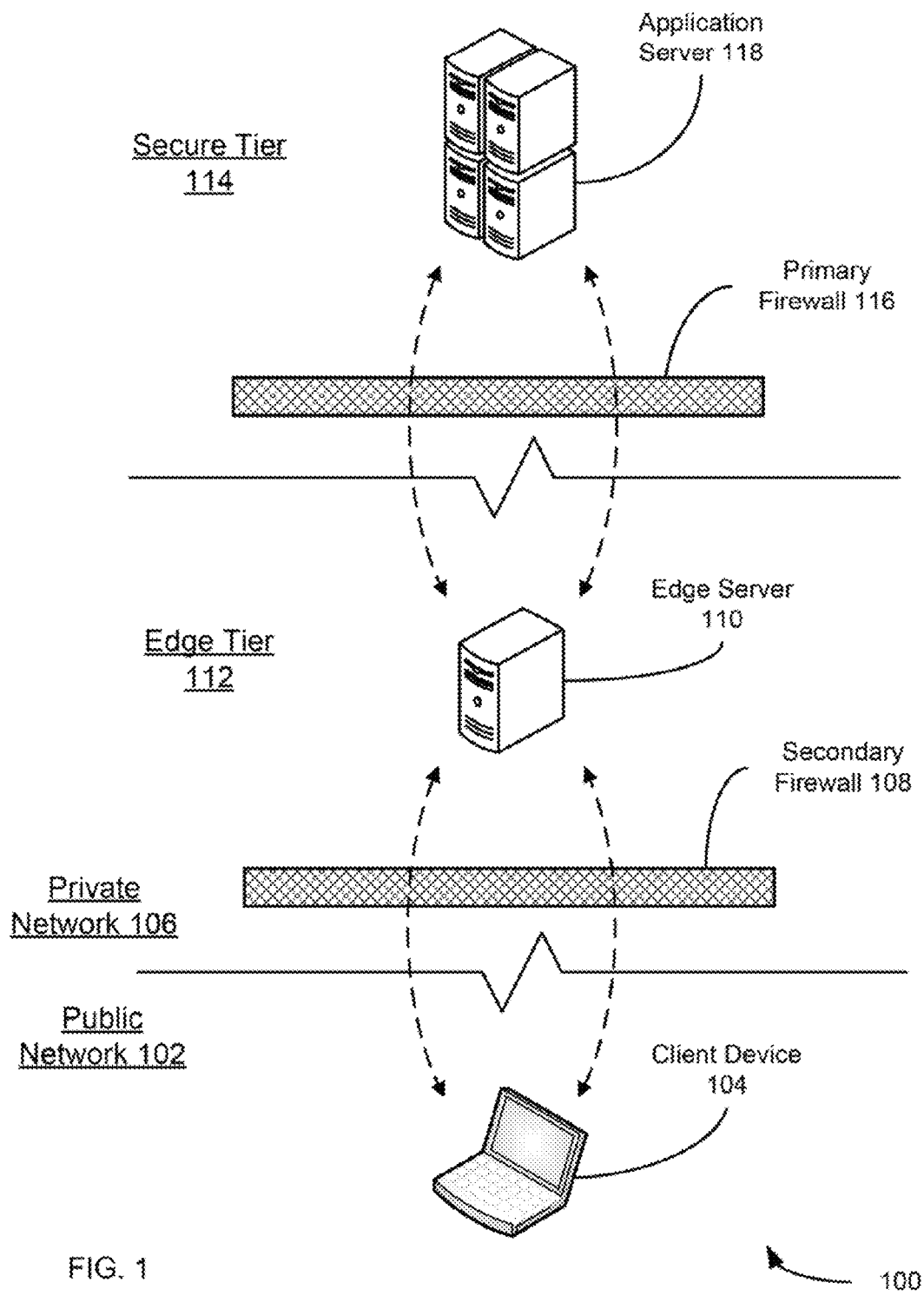
FIG. 1 is a diagram showing an example enterprise data network system.

FIG. 1 shows an example enterprise data network system 100. The data network system 100 includes a public network 102 and a private network 106. A client device 104 communicates with the private network 106 through the public network 102. The private network 106 includes an edge tier 112 where one or more edge servers 110 are deployed and a secure tier 114 where one or more application servers 118 are deployed. The secure tier 114 is isolated from the edge tier 112 and from the public network 102 by a primary firewall 116. The edge tier 112 is isolated from the public network 102 by a secondary firewall 108. The portion of the network system 100 between the primary firewall 116 and the secondary firewall 108 (including the edge tier 112) may be referred to as a "DMZ" of the enterprise data network system 100. The portion of the network system 100 behind the primary firewall 116 (including the secure tier 114) includes an internal network of the enterprise data network system 100. The edge server 110 and the application server 118 collaboratively host a server application. The services of the server application can be declaratively and/or dynamically partitioned between the application server 118 and the edge server 110. As such, the application server 118 is configured to provide a first subset of the server application services, and the edge server 110 is configured to provide a second subset of the server application services. The server application can provide server-side functionality for a rich internet application running on the client device 104.

The edge server 110 provides a configured set of service destinations to the client device 104 while also acting as a gateway to service destinations that only operate on the application server 118. A service destination can process a client service request and/or push asynchronous messages and/or data to subscribed clients. The service destinations operating on the edge server 110 and the service destinations operating on the application server 118 can function collectively as a single server application. For example, the service destinations on the edge server 110 can have full access to the service destinations on the application server 118. Also, the service destinations on the edge server 110 and the service destinations on the application server 118 have full access to any methods and/or attributes of data objects defined by either of the service destinations. As such, data passing between the service destinations may not require data export or other types of reformatting. In some cases, when a client device 104 initiates a session on the edge server 110, configuration data can be pushed or pulled from the application server 118 to the edge server 110. The configuration data sent to the edge server 110 can include an identification of the service destinations provided on the application server 110. In some implementations, any one of the service destinations of a server application can run declaratively at either tier (i.e., the edge tier 112, the secure tier 114) with no impact on client application code or server application code. In some implementations, any of the service destinations of a server application can run at either tier via simple programmatic APIs (e.g., executed during server bootstrap) with no impact on client application code or server application code. As such, there is no need to recode the application in order to change and/or specify in which tier a service destination is executed.

The services of the server application can be partitioned between the edge tier 112 and the secure tier 114. For example, declarative partitioning can be implemented by storing static configuration information in configuration files stored on the servers, by storing static configuration information in one or more databases accessible to the servers, and/or in another manner. The declarative configuration partitioning can be implemented with no changes to application code, allowing the same application code to be stored on both the edge server 110 and the application server 118. As another example, programmatic partitioning of application functionality can be implemented by allowing service modules of the server application to be selectively instantiated and executed on the edge server 110 and/or the application server 118. For example, a custom code plug-in module can be registered with both the edge server 110 and the application server 118. The plug-in module can use server-side configuration application programming interfaces (APIs) to be used, for example at startup or at another time, to enable, disable, and/or customize individual service modules of a server application. Programmatic partitioning can allow more flexibility than static declarative configuration. In some implementations, when the server application is programmatically partitioned between the edge tier 112 and the application tier 114, the edge server 110 can identify what services are available at the edge server 110 and the application server 118 can identify what services are available at the application server 118 without reference to configuration files or a configuration database.

In some implementations, a faster response may be provided to the client device 104 by executing the application code in the edge tier 112 rather than in the secure tier 114. Executing application code in the secure tier 114 may provide a higher level of information security than executing application code in the edge tier 112. As such the application services having less security constraints and more stringent network latency constraints can be executed in the DMZ, while the application services having stricter security constraints and less stringent network latency requirements can be executed in a more secure fashion behind the DMZ (in the secure tier 114). For example, the application server 118 can be configured to perform all services that require a level of information security above some threshold security level. As another example, the edge server 110 can be configured to perform all services that have a latency tolerance below some threshold latency time. The application services provided in the DMZ and/or the application services provided in the internal network can include operations that allow a client to retrieve a value of one or more application variables, operations that allow a client to define a value of one or more application variables, operations that request a processing step to be performed by the server, combinations of these types of operations, and/or other types of operations.

A particular example includes a server application that provides financial services. One service provided by the example application includes a foreign exchange currency pair price feed. The foreign exchange currency pair price feed can include identification of exchange rates between one or more currency units. For example, the foreign exchange currency pair price feed may indicate an exchange rate between the US Dollar and the Euro and/or an exchange rate between the Euro and the Japanese Yen. The foreign exchange currency pair price feed may fluctuate over time and may be based at least partially on public and/or non-security sensitive data. As such, in some cases the foreign exchange currency pair price feed must be pushed to clients with minimum latency and does not have a strong security requirement. Another service provided by the example server application is trade placement fulfillment and confirmation. Trade placement fulfillment and confirmation services may have stronger security requirements (e.g., due to concerns about potential fraud, access to user-specific data, and the like) and tolerate slightly higher latency than the foreign exchange currency pair price feed. In this example, the foreign exchange currency pair price feed service can be provided in the edge tier 112 by an edge server 110, while the trade placement service can be provided by the application server 118. Such partitioning of services across multiple network tiers can provide the lower network latency needed for a first subset of services of a server application (e.g., foreign exchange currency pair price feed, and/or others) and the higher network security needed for a second subset of services of the server application (e.g., trade placement services, and/or others). A client device 104 can access both subsets of services in a seamless manner, without having to specify or request which network tier provides each services.

The client device 104 can be a personal computer, a laptop computer, a handheld mobile device, and/or another type of client device. The client device 104 includes a memory (e.g., a hard drive, a random access memory, and/or other types of memory) and a data processor. The client device can also include a display device (e.g., a monitor, a display screen, and/or another type of display device), removable data storage (e.g., magnetic disk, optical disk, flash memory, CD, DVD, and/or other types of removable data storage), one or more interface devices (e.g., a keyboard, a pointing device, a touchscreen, a printer, and/or other input-output devices), a communication interface (e.g., hardware for communicating over a wireless network, hardware for communicating over a wired network, and/or other types of communication interfaces), a data bus, and/or other features. The system 100 can include additional client devices (e.g., tens, hundreds, thousands, or more client devices).

The memory of the client device 104 stores one or more client applications, and the data processor of the client device 104 can execute the client applications. The client applications can include installed software applications, rich internet applications, and/or other types of applications. The client applications can include client applications designed to run on the Adobe Flash platform, the Adobe Flex platform, and/or another type of application platform. Such client applications can include SWF files and/or other file formats. The client applications can be written in an ActionScript language and/or another type of language. The client applications can include client applications that run in a web browser, on a virtual machine, in an operating system, and/or in a different type of runtime environment.

One or more of the client applications running on the client device 104 can be configured to communicate with a server application running on servers in the private network 106. Such a client application may function based on interactions with a remote server, such as the application server 118 and/or the edge server 110. As such, a client application running on the client device 104 can generate requests for services provided by a server application. The server applications in the private network 106 can interact with one or more client applications running on the Adobe Flash platform, the Adobe Flex platform, and/or another type of application platform. The server applications can be written in Java, C++, and/or another type of programming language. The server applications can include server applications that run on a virtual machine, in an operating system, and/or in a different type of runtime environment. The client device 104 can interact with the edge server 110 using one or more different communication protocols or connection transports. For example, the client device 104 can establish a connection with the edge server 110 using Real Time Messaging Protocol (RTMP), HyperText Transfer Protocol (HTTP) streaming, HTTP long polling, simple HTTP polling or piggybacking, basic HTTP request-response, and/or another type of connection. The requests generated by the client application can be sent through the public network 102 from the client device 104 to one or more of the devices deployed in the private network 106.

The public network 102 can include an unsecured data communication network and/or a secured data network having a different and/or lower security level than the private network 106. The public network 102 can include the Internet and/or another public data communication network. The public network 102 can include a lower security network tier of the enterprise network and/or a private network of a different enterprise network. The public network 102 is not automatically trusted by the private network 106. As such, the private network 106 can authenticate and/or verify data received from the public network 102. In the example shown in FIG. 1, all data received from the public network 102 must be verified and/or authenticated by the secondary firewall 108 before the data received from the public network 102 can be delivered to the edge server 110.

The secondary firewall 108 can isolate all or part of the private network 106 from the public network 102. For example, the secondary firewall 108 can delineate an outer boundary of an enterprise DMZ. The secondary firewall 108 can verify and/or authenticate all data communication traffic between the DMZ (including the edge tier 112) and the public network 102. For example, requests addressed to the application server 118 from the client device 104 can be received by the secondary firewall 108. The secondary firewall 108 can either accept or reject the received requests based on rules implemented by the secondary firewall 108. For example, the secondary firewall 108 can accept, reject, and/or quarantine data received from the public network 102 based on the source of the data, the content of the data, the type of data, a destination of the data, the size of the data, whether and/or how the data is encrypted, password authentication, and/or other factors. The secondary firewall 108 can be implemented using multiple different types of firewall protocols.

Figure 2A:
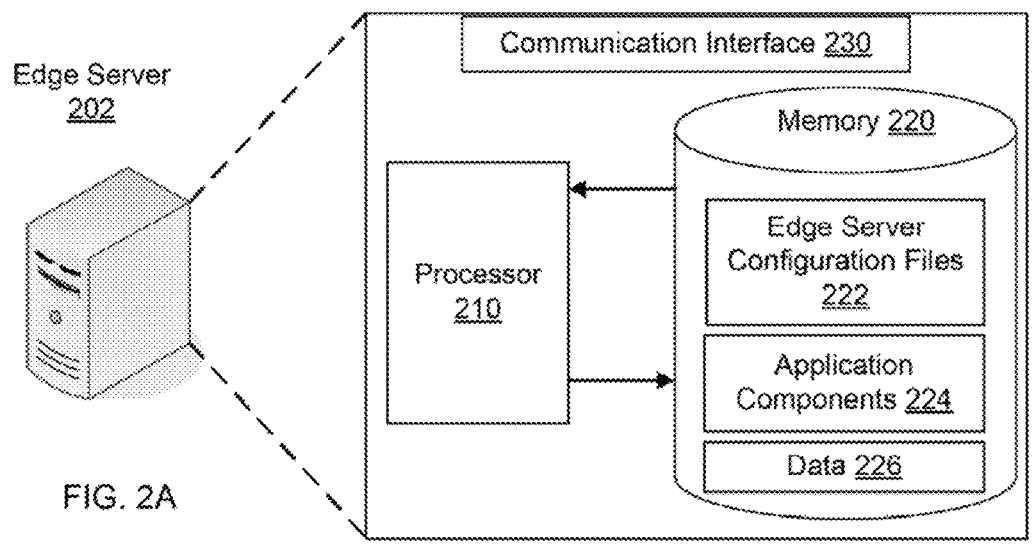
FIG. 2A is a diagram showing an example edge server.

The edge server 110 is a server device that receives requests and/or messages from the client device 104. The system 100 can include additional edge servers 110 deployed in the edge tier 112. The edge servers 110 can operate independently and/or as a server cluster. An example edge server 202 is shown in FIG. 2A. The example edge server 202 includes a processor 210, a memory 220, and a communication interface 230. The memory 220 stores edge server configuration files 222, application components 224, and other data 226. The edge server 202 can also include a display device (e.g., a monitor, a display screen, and/or another type of display device), removable data storage (e.g., magnetic disk, optical disk, flash memory, CD, DVD, and/or other types of removable data storage), one or more interface devices (e.g., a keyboard, a pointing device, a touchscreen, a printer, and/or other input-output devices), a data bus, and/or other features.

The edge server 202 can use the processor 210 to perform a subset of the services of a server application, for example, by executing and/or interpreting application logic of one or more of the application components 224. The edge server configuration can declaratively and/or dynamically partition the services of each server application between the edge server 202 and one or more application servers. The example edge server 202 shown in FIG. 2A performs only those services of each of a server application that are designated by the edge server configuration files 222. For example, if a particular server application provides services A, B, and C, an edge server configuration file 222 may specify that the edge server 202 is only configured to perform services A and B. As such, the edge server 202 can be configured to perform a customized subset of the application services by customizing only the edge server configuration files 222 and without modifying the server application code. In some implementations, the edge server 202 does not include code for performing services that the edge server 202 is not configured to perform.

As shown in FIG. 1, the edge server 110 can function as a reverse proxy to the application server 118. As such, the edge server 110 can control client access and/or data traffic to the application server 118 by receiving requests and/or messages addressed to the application server 118 from the client device 104. The edge server 110 can respond to the requests received from the client device 104 by sending a response to the client device 104. The edge server 110 can forward the requests received from the client device 104 to the application server 118. The edge server 110 can determine whether the edge server 110 is configured to perform a requested service, for example, by consulting a configuration file stored on the edge server 110. If the edge server 110 determines that it is configured to provide the requested service, the edge server 110 can perform the service by interpreting and/or executing server application logic stored on the edge server 110. If the edge server 110 determines that it is not configured to provide the requested service, the edge server 110 can forward the request to the application server 118. Forwarding a request to the application server 118 can include sending the received request or generating a new request based on the received request and sending the new request.

In the example shown in FIG. 1, the edge tier 112 is transparent to the client device 104. For example, the client application running on the client device 104 may have no knowledge of the partitioning of services between the edge server 110 and the application server 118. As such, the client application addresses all requests to an application server, and all responses received from the edge server 110 appear to the client application as though the responses were sent from an application server.

In the example shown in FIG. 1, the secure tier 114 only receives data from within the private network 106, and all data sent to the secure tier 114 from the edge tier 112 must be verified and/or authenticated by the primary firewall 116. Thus, in the example, requests and/or messages sent from the edge server 110 to the application server 118 must be verified and/or authenticated by the primary firewall 116 before they can be delivered to the application server 118.

The primary firewall 116 can isolate the enterprise's internal network from all external systems and data traffic. For example, the primary firewall 116 can isolate the internal network from the DMZ. Devices in the internal network can communicate with the highest level of trust within the internal network, for example, by assuming that data received from any other device in the internal network is valid and authenticated. Devices in the internal network can communicate with devices outside of the internal network through the primary firewall 116. In some implementations, devices in the internal network only accept data generated by known processes running in the DMZ.

The primary firewall 116 can verify and/or authenticate all data communication traffic between the DMZ (including the edge tier 112) and the public network 102. For example, requests addressed to the application server 118 from the edge server 110 can be receive by the primary firewall 116. The primary firewall 116 can either accept or reject the received requests based on rules implemented by the primary firewall 116. For example, the primary firewall 116 can accept, reject, and/or quarantine received data based on the source of the data, the content of the data, the type of data, a destination of the data, the size of the data, whether and/or how the data is encrypted, password authentication, and/or other factors. In some cases, the primary firewall 116 implements a higher level of data security than the secondary firewall 108. The primary firewall 116 can be implemented using multiple different types of firewall protocols.

Figure 2B:
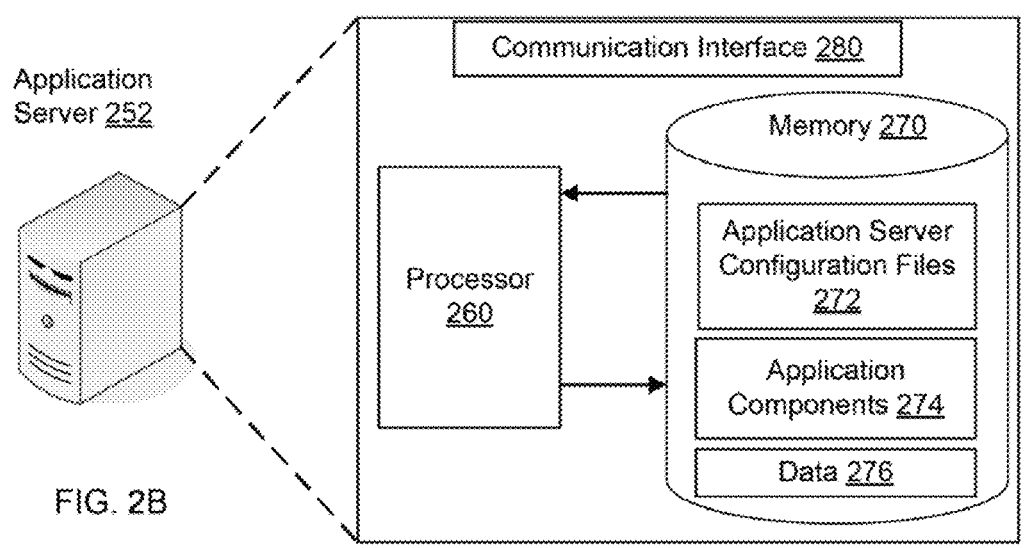
FIG. 2B is a diagram showing an example application server.

The application server 118 is a server device that communicates with the client device 104 through an edge server. The system 100 can include multiple application servers 118 deployed in the secure tier 114. The application servers 118 can operate independently and/or as an application server cluster. An example application server 252 is shown in FIG. 2B. The example application server 252 includes a processor 260, a memory 270, and a communication interface 280. The memory 270 stores application server configuration files 272, application components 274, and other data 276. The application server 252 can also include a display device (e.g., a monitor, a display screen, and/or another type of display device), removable data storage (e.g., magnetic disk, optical disk, flash memory, CD, DVD, and/or other types of removable data storage), one or more interface devices (e.g., a keyboard, a pointing device, a touchscreen, a printer, and/or other input-output devices), a data bus, and/or other features.

The application server 252 can use the processor 260 to perform a subset of the services of a server application, for example, by executing and/or interpreting application logic of the application components 274. The application server 252 is configured, according to the application server configuration files 272, to perform a subset of the services provided by a server application. For example, if a particular server application provides services A, B, and C, an application server configuration file 272 may specify that the application server 252 is only configured to perform service C. The application server configuration file 272 may also specify that an edge server is configured to perform services A and B. As such, the application server 252 can be configured to perform a customized subset of the application services using only the application server configuration files 272 and without modifying the server application code.

One or more of the application components 224 stored on the edge server 202 and one or more of the application components 274 stored on the application server 252 can collectively provide all of the services of a given server application. For example, one of the application components 224 on the edge server 202 can provide a first subset of services of a given server application, and one or more of the application components 274 on the application server 252 can provide a second subset services of the given server application. The server application components 274 stored on the application server 252 may include code that is not included in the server application components 224 stored on the edge server 202. For example, the server application components 274 may include code for secure services that require a level of security provided in the secure tier 114 but not in the edge tier 112. Similarly, the server application components 224 stored on the edge server 202 may include code that is not included in the server application components 274 stored on the application server 252. In some implementations, the application components 224 stored on the edge server 202 and the application components 274 stored on the application server 252 can be identical for a given server application, and the edge server configuration files 222 designate which of the components are available to be executed on the edge server 202 while the application server configuration files 272 designate which of the components are available to be executed on the application server 252.

As shown in FIG. 1, the application server 118 receives requests for services from the edge server 110 and sends responses to the edge tier 112. The application server 118 can determine whether the application server 118 is configured to perform a requested service, for example, by consulting a configuration file stored on the application server 118. If the application server 118 determines that it is configured to provide the requested service, the application server 118 can perform the service by interpreting and/or executing server application logic stored on the application server 118. In some implementations, the application server 118 may assume that it is configured to perform a requested service based on the edge server 110 forwarding the request to the application server 118.

In some instances, the edge server 110 and the application server 118 are functionally equivalent but have different static configurations. The edge server configuration, discussed in more detail with respect to FIGS. 3A and 3B, can define a GatewayService data object that opens and manages gateway connections to the application server 118 on behalf of the client device 104. The application server 118 configuration can define a GatewayEndpoint data object that serves as the network endpoint for the gateway connections that the edge server 110 opens on behalf of the client device 104.

Edge servers 110 deployed in the edge tier 112 and/or application servers 118 deployed in the secure tier 114 can be clustered independently to scale out capacity horizontally at each tier. In some implementations, the GatewayService data object executing within an edge server 110 can connect to one application server 118 from a list of statically addressed application servers 118 in the secure tier 114. When a gateway connection is successfully established between an edge server 110 and an application server 118, a full view of the application server 118 functionality can be retrieved to the edge server 110. The retrieved data can include information describing statically and dynamically configured service destinations that the application server 118 provides and/or the network addresses for all available cluster nodes in the secure tier 114.

In some implementations, the edge server 110 can open a gateway connection to application servers 118 in a round-robin fashion, by a load balancing technique, and/or in another manner. For example, a LoadCalculator data object may be deployed in an application server 118, and the edge server 110 can periodically query the LoadCalculator data object to determine the reported loads across the application server cluster. The gateway connections can be long-lived TCP socket connections, and such load consideration may be considered when the edge server 110 opens a new gateway connection on behalf of a new client device 104. However, in some cases, data traffic for already-connected clients is not load balanced across servers. In such cases, a client device 104 may be "pinned" to a single application server 118. "Pinning" a client device 104 to an application server 118 may help manage a subscription state for the client device 104 and/or help manage the potentially rapidly changing state of the queue of messages and data to push to the client. "Pinning" a client device 104 to an application server 118 may help avoid a cost associated with replicating a message queue in real-time and/or in a strongly consistent fashion across multiple nodes of a cluster.

The GatewayService data object defined by the edge server 110 can verify that a client device 104 is actively authenticated before opening a new gateway connection to an application server 118 on behalf of the client device 104. After a client's authentication state from the edge tier 112 is synchronized to the secure tier 114, the client's request and/or message is passed over the gateway connection for secure processing by the application server 118. Any later change in the client's authentication state, such as a subsequent logout, can be synchronized across the edge tier 112 and the secure tier 114. Authorization checks may be applied at both the edge server 110 and the application server 118 on a per-service and/or per-service destination basis. For some service types, authorization checks may be applied at even finer granularities, for example, at the level of a specific service operation.

A server-side session state can be maintained at both the edge server 110 and the application server 118. In some implementations, the server-side session state is not automatically synchronized across tiers (for example, due to security concerns and/or other concerns). In some cases, security concerns dictate that any per-client data tracked at the application server 118 must not be unintentionally exposed at the edge tier 112. In some cases, messages can be sent between the edge tier 112 and the secure tier 114 on behalf of a known client to synchronize some subset of a server-side session state. If the session state at either end of a gateway connection is invalidated, its mirror component can be invalidated and the remote client can be notified. Invalidating a session in such a manner can preserve the ordered processing provided by reliable messaging and allow the client device 104 to maintain a consistent cross-tier server-side session state.

Reliable messaging between a client and the partitioned application can ensure in-order, once-and-only-once delivery of request, reply and pushed messages in either direction between the client and server portions of the application. Synchronizing shut down of server session state across tiers and to the client may ensure a well-defined conclusion to any existing reliable message sequence between the client and server. Such synchronization may prevent out-of-order delivery and/or redelivery problems across reconnect attempts and reconnections between the client and the partitioned server application. In some implementations, reliable message exchange can be enforced at the logical connection level between a client and the server application, and individual service destinations can be tagged as reliable or not reliable. Such implementations may allow a single transport connection to serve as a channel for both reliable and unreliable interactions between the client and server.

In one aspect of operation, the client device 104 runs a rich internet application that interacts with a server application hosted on the edge server 110 and the application server 118. The server application is partitioned between the DMZ (which includes the edge tier 112) and the internal network (which includes the secure tier 114). The edge server 110 and the application server 118 perform multiple different services of the server application in response to requests received from the client application. The services of the server application include two example services "S1" and "S2." A request for service "S1" is sent from the client device 104 through the public network 102 and is received by the secondary firewall 108. The secondary firewall 108 validates and/or authenticates the request. The edge server 110 receives the request for service "S1" from the secondary firewall 108. The edge server 110 determines that the edge server 110 is configured to perform service "S1." For example, the edge server 110 may access a configuration file that identifies service "S1" as a service to be provided by the edge server 110. The edge server 110 performs service "S1" by executing and/or interpreting application code, and the result is sent back to the client device 104 through the secondary firewall 108 and through the public network 102.

In the same aspect of operation, the client application running on the client device 104 sends a request for service "S2" of the server application. The request for service "S2" is sent from the client device 104 through the public network 102, and the request is received by the secondary firewall 108. The secondary firewall 108 validates and/or authenticates the request. The edge server 110 receives the request for service "S2" from the secondary firewall 108. The edge server 110 determines that the edge server 110 is not configured to perform service "S2." For example, the edge server 110 may determine that the application server 118 is configured to perform service "S2" by accessing application server configuration data pulled from the application server 118. The edge server 110 relays the request for service "S2" through the primary firewall 116 to the application server 118. The primary firewall 116 validates and/or authenticates the request. The application server 118 receives the request for service "S2" and performs service "S2" by executing and/or interpreting application code. The result is sent back to the client device 104 through the primary firewall 116, through at least a portion of the edge tier 12, through the secondary firewall 108, and through at least a portion of the public network 102.

Figure 3A:
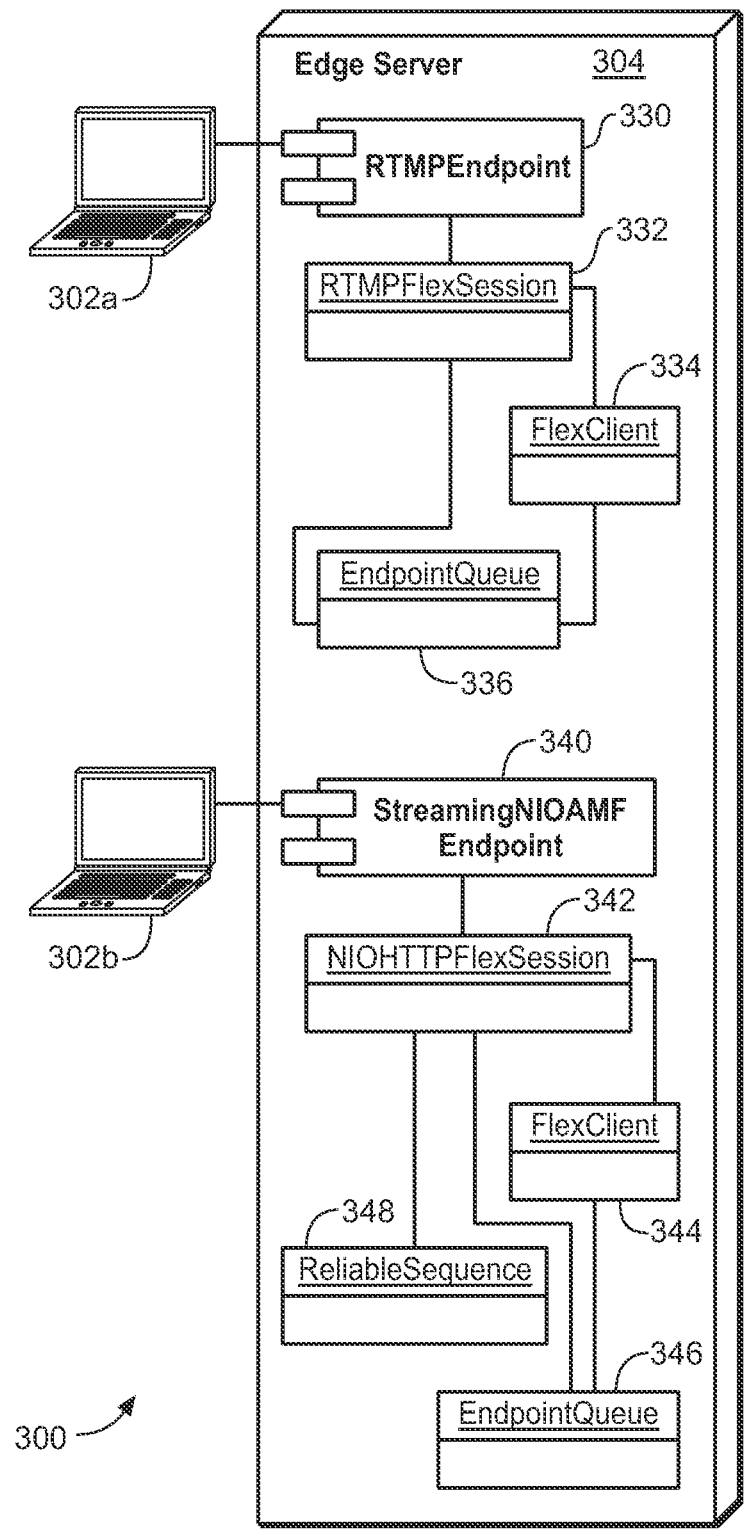
FIG. 3A is a block diagram showing aspects of an example enterprise data network system.

FIG. 3A shows operational aspects of an example data network system 300 that includes a first client device 302*a*, a second client device 302*b*, and an edge server 304. Each of the client devices 302*a*/302*b* can be the client device 104 of FIG. 1, and the edge server 304 can be the edge server 110 of FIG. 1. FIG. 3A shows the clients 302*a* and 302*b* interacting with service destinations hosted on the edge server 304.

In the example shown, the first client 302*a* communicates over a Real Time Messaging Protocol (RTMP) connection with the RTMPEndpoint data object 330 on the edge server 304. The edge server 304 maintains a FlexClient instance 334 representing a SWF application and an RTMPFlexSession data object 332 representing the connection between the client 302*a* and the edge server 304. The client 302*a* has subscribed to receive pushed messages, and the edge server 304 has created an EndpointQueue data object 336 that is scoped to the connection with the first client 302*a*. The EndpointQueue data object 336 stores messages to push for any subscription the client 302*a* has established over its RTMP connection.

The second client 302*b* communicates over a streaming Action Message Format (AMF) connection with the StreamingNIOAMFEndpoint data object 340 on the edge server 304. The edge server 304 maintains a FlexClient instance 344 that represents a SWF application and a NIOHTTPFlexSession data object 342 representing the connection between the client 302*b* and the edge server 304. The second client 302*b* has an EndpointQueue 346 indicating that it has subscribed to at least one service destination on the edge server 304. In addition, the second client 302*a* has a server-side ReliableSequence 348, indicating that it is interacting with some number of service destinations reliably.

Figure 3B:
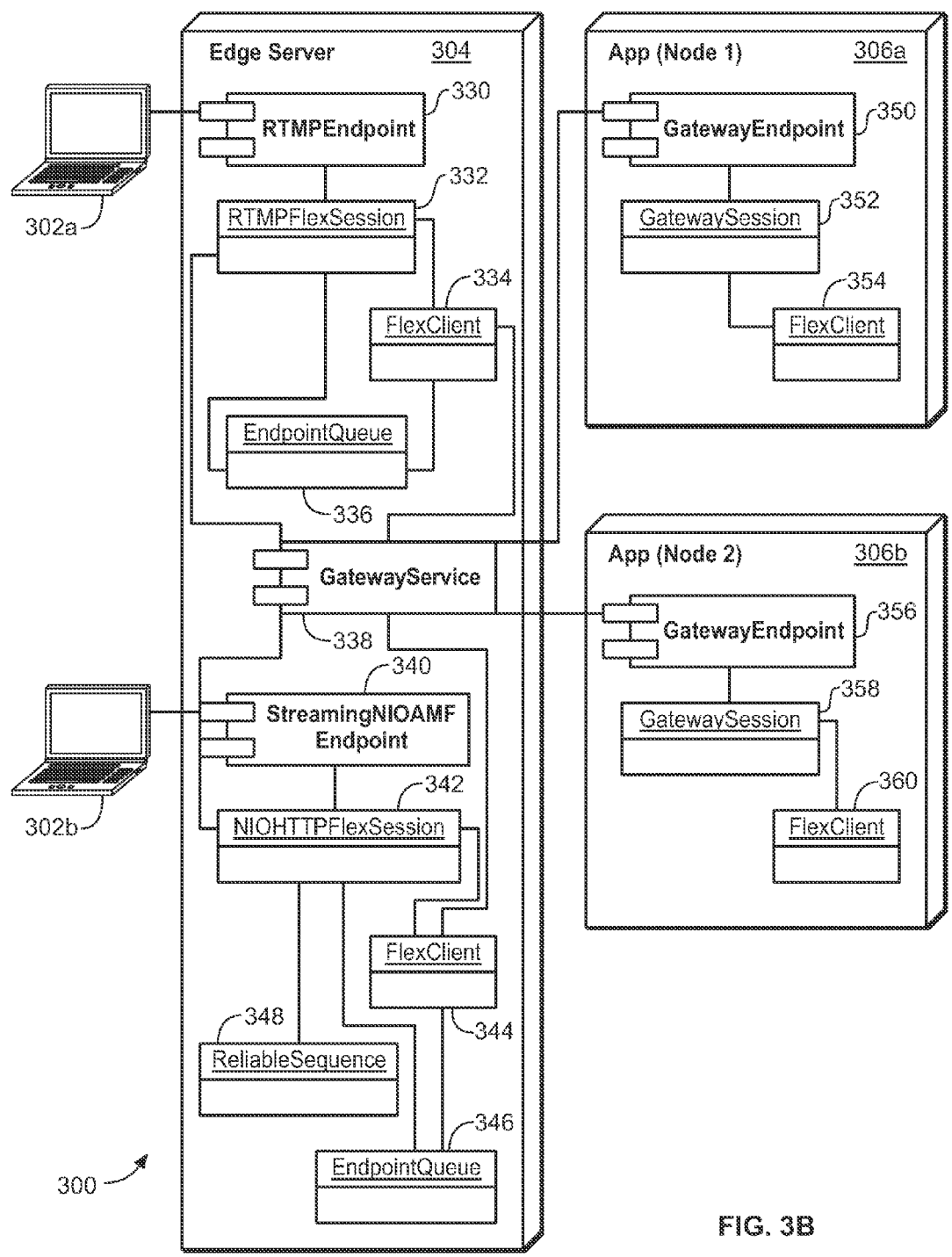
FIG. 3B is a block diagram showing aspects of an example enterprise data network system.

FIG. 3B shows additional operational aspects of the example data network system 300 of FIG. 3A. As shown in FIG. 3B, the data network system 300 additionally includes a first application server 306*a* and a second application server 306*b*. Each of the application servers 306*a*/306*b* can be the application server 118 of FIG. 1.

As shown in FIG. 3B, when the client 302*a* and/or the client 302*b* sends a message to a service destination that is hosted on an application server (e.g., the application server 306*a* and/or the application server 306*b*), a GatewayService data object 338 opens a gateway connection to the appropriate application server on behalf of the client. In some implementations, when a client interacts with an application server, the client has a dedicated gateway connection. In some implementations, an application is hosted by a cluster of application servers, and the GatewayService data object 338 can distribute a processing load across the cluster nodes.

The GatewayService data object 338 can send instructions to a GatewayEndpoint data object on an application server to request that the GatewayEndpoint data object create a FlexClient data object and an associated GatewayFlexSession instance. As shown in FIG. 3B, the GatewayService data object 338 has opened two gateway connections, one for the first client 302*a* and one for the second client 302*b*. The gateway connection for the first client 302*a* terminates at the GatewayEndpoint data object 350 on the first application server 306*a*, and the gateway connection for the second client 302*b* terminates at the GatewayEndpoint data object 356 on the second application server 306*b*. The clients 302*a* and 302*b* can interact with service destinations running on the respective application servers 306*a* and 306*b* through the GatewayService data object 338. The clients 302*a* and 302*b* can also interact with service destinations running on the edge server 304 through the RTMPEndpoint 330 and the StreamingNIOAMFEndpoint 340, respectively.

Figure 4:
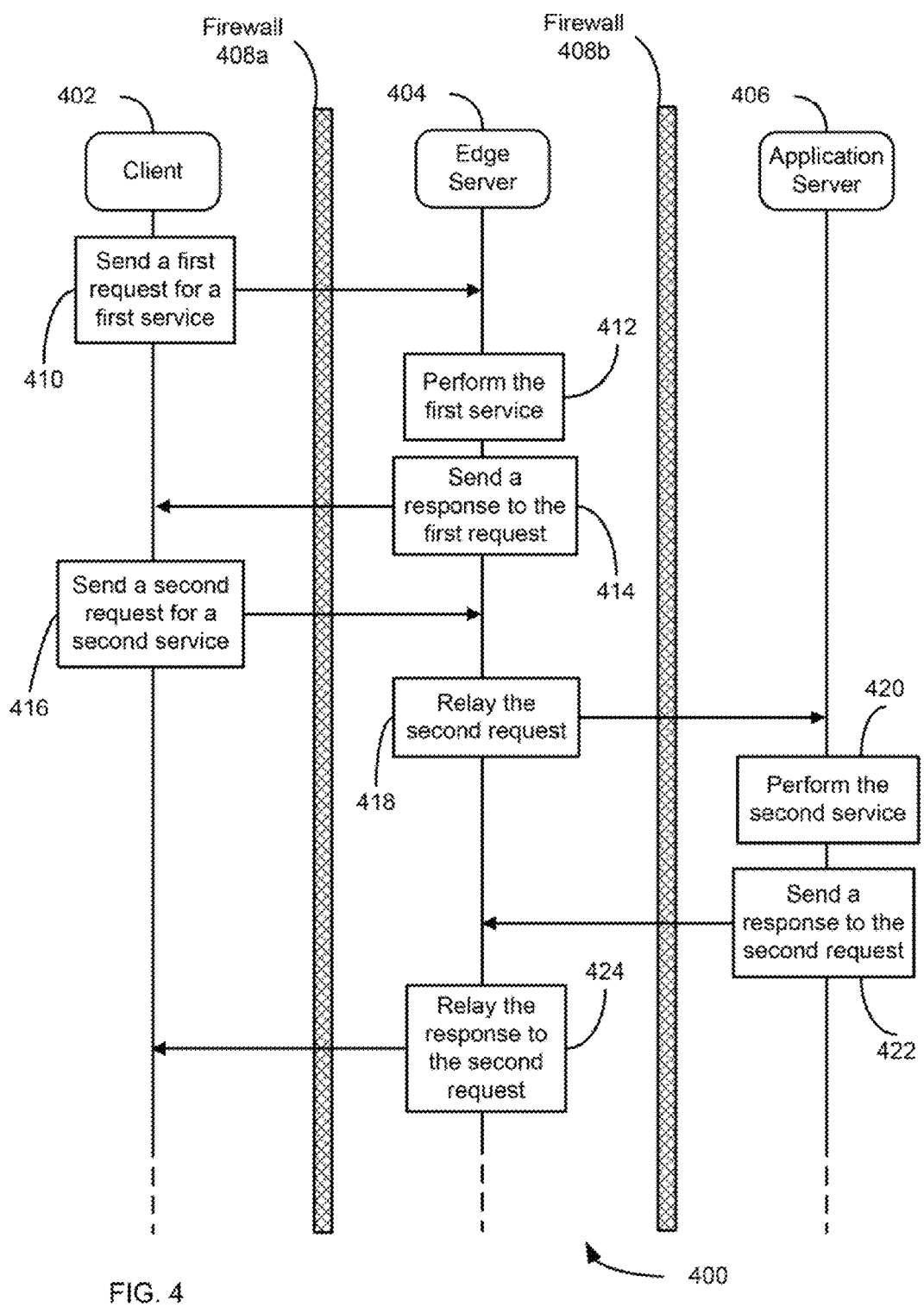
FIG. 4 is a signaling and flow diagram showing example operations and interactions in an enterprise data network system.

FIG. 4 shows example operations and interactions in an example enterprise data network system 400. The system 400 includes a client device 402, an edge server 404, an application server 406, a first firewall 408*a*, and a second firewall 408*b*. The system 400 can include one or more of the elements of the system 100 of FIG. 1. For example, the client device 402 can be the client device 104 of FIG. 1, the firewall 408*a* can be the secondary firewall 108 of FIG. 1, the edge server 404 can be the edge server 110 of FIG. 1, the firewall 408*b* can be the primary firewall 116 of FIG. 1, and/or the application server 406 can be the application server 118 of FIG. 1. Some example operations and interactions in the system 400 are shown in FIG. 4. The operations and interactions shown may be performed in the order shown and/or in a different order;

additional and/or different operations and interactions may be also performed in the system 400.

At 410, a first request for a first service of a server application is sent from the client 402 to the edge server 404. The first request is sent through a public data network and authenticated by the firewall 408a prior to receipt by the edge server 404. At 412, the edge server 404 performs the first service in response to the first request. For example, the edge server 404 can execute and/or interpret server application code stored on the edge server 404 to perform the requested service. At 414, the edge server sends the client 402 a response to the first request. The response to the first request includes an identification of a first result of performing the first service.

At 416, a second request for a second service of the server application is sent from the client 402 to the edge server 404. The second request is sent through the public data network and authenticated by the firewall 408a prior to receipt by the edge server 404. At 418, the edge server 404 relays the second request to the application server 406. The relayed second request is authenticated by the firewall 408b prior to receipt by the application server 406. At 420, the application server 406 performs the second service in response to the relayed second request. For example, the edge server 404 can execute and/or interpret server application code stored on the application server 406 to perform the requested service. At 422 the application server 406 sends the edge server 404 a response to the relayed second request. In some implementations, the response to the relayed second request can be sent to a different edge server in an edge tier between the firewall 408a and 408b. At 424, the response from the application server 406 is relayed to the client 402 from the edge server 404 or from another edge server in the edge tier.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), and peer-to-peer networks (e.g., ad hoc peer-to-peer networks). The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

The invention claimed is:
1. A method comprising:
hosting a server application on a plurality of servers, the plurality of servers including an application server deployed in a secure tier of an enterprise network and an edge server deployed in an edge tier of the enterprise network, a first firewall isolating the secure tier from the edge tier and from a public network and a second firewall isolating the edge tier from the public network,
wherein the edge server is configured to: (a) receive requests for services provided by the server application, the requests sent by at least one client device through the public network and authenticated by the second firewall, (b) perform a first subset of the services by executing application logic of the server application stored on the edge server, and (c) relay a subset of the requests to the application server, and
wherein the application server is configured to: (a) receive the relayed subset of requests, the relayed subset of requests authenticated by the first firewall, and (b) perform a second subset of the services in response to the relayed subset of requests by executing application logic of the server application stored on the application server;
identifying latency tolerances for each of the first subset of services and for each of the second subset of services;
configuring the edge server to perform the first subset of the services based at least in part on the latency tolerances identified for the first subset of services; and
configuring the application server to perform the second subset of the services based at least in part on the latency tolerances identified for the second subset of services.

2. The method of claim 1, wherein the edge server supports multiple different transport protocols.

3. The method of claim 1, wherein the edge tier is transparent to the at least one client device.

4. The method of claim 1, further comprising:
configuring the edge server to perform the first subset of the services based at least in part on a first configuration file stored in a memory of the edge server, the first configuration file identifying the first subset of the services as services that the edge server is configured to perform, the edge server storing application logic for performing both the first subset of the services and the second subset of the services; and
configuring the application server to perform the second subset of the services based at least in part on a second configuration file stored in a memory of the application server, the second configuration file identifying the second subset of the services as services that the application server is configured to perform, the application server storing application logic for performing both the first subset of the services and the second subset of the services.

5. The method of claim 1, wherein the latency tolerances identified for the second subset of services include higher latency tolerances than the latency tolerances identified for the first subset of services.

6. The method of claim 1, wherein the edge tier is included in a DMZ of the enterprise network, the secure tier is included in an internal network of the enterprise, and the DMZ isolates the internal network from the public network.

7. The method of claim 1, wherein the edge server comprises a first edge server device, the application server comprises a first application server device, the plurality of servers further comprising:
a plurality of additional application servers deployed in the secure tier of the enterprise network; and
a plurality of additional edge servers deployed in the edge tier of the enterprise network.

8. The method of claim 1, further comprising:
identifying levels of information security required for each the first subset of services and for each of the second subset of services;

configuring the edge server to perform the first subset of the services based at least in part on the levels of information security required for the first subset of services; and configuring the application server to perform the second subset of the services based at least in part on the levels of information security required for the second subset of services.

9. The method of claim 8, wherein the identified levels of information security required for the second subset of services include higher levels of information security than the identified levels of information security required for the first subset of services.

10. A computer storage medium encoded with a computer program, the program comprising instructions that when executed by a data processing apparatus cause the data processing apparatus to perform the following actions:

receiving a first request for a first service of a server application, the first request sent by a client device through a public data network and authenticated by a second firewall prior to receipt by an edge server system having a first configuration, the edge server system isolated from the public data network by the second firewall;

performing the first service of the server application at the edge server system in response to the first request, wherein the edge server system is configured to perform the first service at least partially based on an identification of a latency tolerance associated with the first service;

sending a first response to the client, the first response including an identification of a first result of performing the first service;

receiving a second request for a second service of the server application, the second request sent by a client device through the public data network and authenticated by the second firewall prior to receipt by the edge server system;

sending a third request for the second service of the server application from the edge server system through a first firewall to an application server system having a second configuration, the application server system isolated from the edge server system and from the public data network by the first firewall;

performing the second service of the server application at the application server system in response to the third request, wherein the application server system is configured to perform the second service at least partially based on an identification of a latency tolerance associated with the second service;

receiving at the edge server system a second response from the application server system in response to the third request, the second response comprising an identification of a second result of performing the second service of the server application system at the application server system; and sending a third response to the client, the third response comprising an identification of the second result.

11. The computer storage medium of claim 10, further comprising:

defining on the edge server system a first authentication state for a first client device; and sending authentication data from the edge server system to the application server system to synchronize the first authentication state with an authentication state for the first client device defined on the application server system.

12. The computer storage medium of claim 10, the operations further comprising:

identifying at the edge server system that the edge server system is configured to perform the first service; and identifying at the edge server system that the application server system is configured to perform the second service based at least in part on application server system configuration data received from the application server system.

13. The computer storage medium of claim 10, wherein the edge server system comprises a plurality of edge server devices, the third request is sent by a first one of the edge server devices, and the second response is received by a second one of the edge server devices.

14. The computer storage medium of claim 10, the edge server system storing a first configuration file for the first configuration, the first configuration file including identifications of a first plurality of services of the server application that the edge server system is configured to perform, the first plurality of services comprising the first service.

15. The computer storage medium of claim 14, the first server storing application logic for performing the first plurality of services.

16. The computer storage medium of claim 14, the application server system storing a second configuration file for the second configuration, the second configuration file including identifications of the second plurality of services of the server application that the application server system is configured to perform, the second plurality of services including the second service.

17. The computer storage medium of claim 16, wherein the second plurality of services require higher security processing than the first plurality of services, and the second plurality of services have a higher latency tolerance than the first plurality of services.

18. An enterprise network system comprising:

an edge server deployed in a first tier of an enterprise data network and isolated from a public data network by a second firewall, the edge server configured to:

receive a plurality of requests for a corresponding plurality of services provided by a server application hosted on the enterprise network system, the plurality of requests sent by at least one client device through the public network and authenticated by the second firewall;

identify a first subset of the plurality of services based on latency tolerances associated with the first subset of the plurality of services;

identify a second subset of the plurality of services based on latency tolerances associated with the second subset of the plurality of services;

perform the first subset of services; and relay a subset of requests corresponding to the second subset of the plurality of services to the application server; and an application server deployed in a second tier of the enterprise network and isolated from the public network and from the first tier by a first firewall, the application server configured to:

receive the relayed subset of requests, the relayed subset of requests authenticated by the first firewall; and perform the second subset of services in response to the subset of requests.

19. The enterprise network system of claim 18, the edge server including a first edge server, the application server including a first application server, the system further comprising:

a plurality of additional edge servers deployed in the first tier and configured as the first edge server; and a plurality of additional application servers deployed in the second tier and configured as the application server.

20. The enterprise network system of claim 18, wherein the edge server and the application server store one or more configuration files that declaratively partition server application functionality between the edge server and the application server.

21. The enterprise network system of claim 18, wherein the edge server is adapted to function as a reverse proxy to the application server.

22. The enterprise network system of claim 18, further comprising a plurality of client devices each running a client application that generates requests for services of the server application.

\* \* \* \* \*